D. H. DOWNEY.
SPROCKET GEAR.
APPLICATION FILED MAY 31, 1910.
975,938.
Patented Nov. 15, 1910.
Fig. 1.
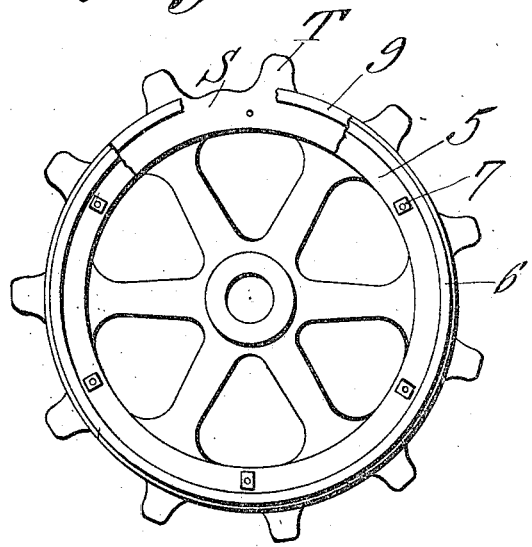
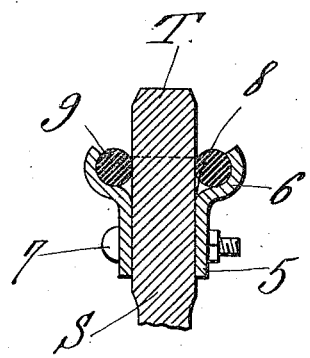
Fig. 2.
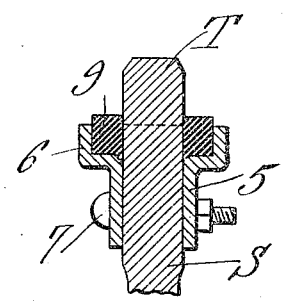
Fig. 3.
Witnesses
David H. Downey,
Inventor
by ⟨Attorneys⟩

UNITED STATES PATENT OFFICE.

DAVID H. DOWNEY, OF TIFFIN, OHIO.

SPROCKET-GEAR.

975,938.  Specification of Letters Patent.  Patented Nov. 15, 1910.

Application filed May 31, 1910. Serial No. 564,136.

*To all whom it may concern:*

Be it known that I, DAVID H. DOWNEY, a citizen of the United States, residing at Tiffin, in the county of Seneca and State of Ohio, have invented a new and useful Sprocket-Gear, of which the following is a specification.

It is the object of the present invention to provide an improved sprocket gear and the primary aim of the invention is to provide a gear of this type which will be noiseless in operation and more specifically the invention aims to provide a device which may be attached to any ordinary sprocket gear or may be embodied in the structure of the gear at time of manufacture and will serve as a cushion between the teeth of the gear and the links of the sprocket chain trained about the gear. Or more specifically speaking, the invention resides in the provision, upon the opposite faces of a sprocket gear, of flanges in each of which is seated a rubber or otherwise suitable elastic cushion element in the form of a ring.

With the above and other objects in view, the invention consists in the construction and arrangement of parts shown in the accompanying drawings, in which, Figure 1 is a view in side elevation, parts being broken away, of a sprocket gear embodying the present invention, Fig. 2 is a vertical sectional view through the outer portion of the gear, and, Fig. 3 is a view similar to Fig. 2 but illustrating a slight modification of the invention.

In the drawings, the sprocket gear proper is indicated in general by the reference character S and the teeth thereof by the reference character T. In either embodiment of the invention here shown, the same consists primarily of a flange which is annular in form and is attachable to an ordinary sprocket gear in the manner shown in Fig. 1 of the drawings and this flange is preferably formed from sheet metal so bent or stamped as to afford an attaching portion 5 and an off-set portion 6. In applying the device to a sprocket gear, one of the flanges is disposed against each side face of the gear and the securing bolts 7 are secured through the flanges and the body of the sprocket gear S. It will be observed that when the flanges are properly employed or attached to the gear, the off-set portion 6 of each flange will afford, in conjunction with that face of the gear upon which the flange is secured, a groove or channel indicated by the numeral 8 and in this groove or channel is removably fitted an elastic or yieldable cushioning ring 9 which is preferably of rubber although it may be of other material if found desirable or expedient.

In Fig. 2 of the drawings, the cushion ring employed is illustrated as circular in cross section whereas in Fig. 3 of the drawings it is illustrated as rectangular in cross section but the cross sectional contour of the ring is purely a matter of choice and may be varied to suit the conditions under which the ring is to be used, without departing from the spirit of the invention. Also, it will be readily understood that should it be desired to make the rings 9 from material other than rubber, this may be done without in any way departing from the principle of the invention which contemplates that a cushion of some sort shall be supported in the manner here shown and the invention is consequently not restricted to any specific material to be used in the manufacture of the cushion.

It will be observed from an inspection of the several figures of the drawings that the flanges are so located upon the gear that the cushion rings 9 supported thereby will be substantially coincident with a circle touching the periphery of the sprocket gear at points between the teeth thereof. Consequently, a chain trained about the gear will have its links bearing against the outer sides of the rings 9 and rattling of the chain upon the gear will be in this manner effectually prevented. It will still further be understood from an inspection of the drawings and from the foregoing description that the cross sectional shape of the flange member is to be varied with the cross sectional shape of the rings. Furthermore, the invention contemplates primarily the provision of a cushion element of the class described and a support therefor embodied in the flanges 5 and contemplates that these flanges and the cushion element may be manufactured and assembled with the sprocket gear at the time of its manufacture or may be made in various sizes and placed upon the market separately and distinct from the sprocket gear and then applied to such gear by the purchasers. Also, the cushion rings 9, being removable, may be readily replaced when they become worn and in fact this will in all likelihood be repeatedly done before it is necessary to substitute a new set of flanges.

What is claimed is:—

An attachment for gears comprising an annular attaching portion having a flange projecting laterally from its outer peripheral edge, said flange at its outer edge being formed with a flange projecting radially and adapted to provide between it and the face of the gear to which the attaching portion is secured, a channel, and a cushion element seated removably in the channel.

In testimony that I claim the foregoing as my own, I have hereto affixed my signature in the presence of two witnesses.

DAVID H. DOWNEY.

Witnesses:
 CHARLES E. DERR,
 H. G. SPAYTH.